(12) United States Patent
Keller et al.

(10) Patent No.: US 7,484,891 B2
(45) Date of Patent: Feb. 3, 2009

(54) OIL FILM BEARING FOR ROLL PINS HAVING A HYDROSTATIC SUPPORT

(75) Inventors: Karl Keller, Hilchenbach (DE); Konrad Roeingh, Hilchenbach (DE)

(73) Assignee: SMS Demag AG, Düsseldorf (DE)

( * ) Notice: Subject to any disclaimer, the term of this patent is extended or adjusted under 35 U.S.C. 154(b) by 391 days.

(21) Appl. No.: 10/567,895

(22) PCT Filed: Jul. 7, 2004

(86) PCT No.: PCT/EP2004/007435

§ 371 (c)(1),
(2), (4) Date: Feb. 8, 2006

(87) PCT Pub. No.: WO2005/017377

PCT Pub. Date: Feb. 24, 2005

(65) Prior Publication Data

US 2008/0175523 A1    Jul. 24, 2008

(30) Foreign Application Priority Data

Aug. 8, 2003   (DE) ............................. 103 36 894

(51) Int. Cl.
*F16C 32/06* (2006.01)
(52) U.S. Cl. ....................... 384/100; 384/118
(58) Field of Classification Search ............... 384/100, 384/114, 116, 117, 118
See application file for complete search history.

(56) References Cited

U.S. PATENT DOCUMENTS 3,998,502 A    12/1976   Walter et al.
4,772,137 A *  9/1988   Salter et al. ............... 384/120
4,944,609 A *  7/1990   Salter et al. ............... 384/118
5,000,584 A *  3/1991   Simmons ..................... 384/118

FOREIGN PATENT DOCUMENTS

| DE | 242 456 | 1/1987 |
| EP | 0 812 995 | 12/1997 |
| EP | 1 298 335 | 4/2003 |

* cited by examiner

*Primary Examiner*—Thomas R Hannon
(74) *Attorney, Agent, or Firm*—Friedrich Kueffner

(57) ABSTRACT

An oil film bearing (1) for roll pins (4), which or whose pin bush (3) that is placed thereon is surrounded by a bearing bush (3) placed in an insert (2). The bearing bush has at least two inner lying hydrostatic pockets (9, 9'), which are arranged, in essence, in a common axial line and which can be supplied with a pressure medium via a check valve (18) and via boreholes (6, 6') extending inside the bearing bush (5). Throttles (15, 15') inside the boreholes (6, 6') ensure an optimal hydrostatic bearing even when the roll pin (4) or the pin bush (3) is in an oblique position inside the bearing bush (5). The aim of the invention is to improve an oil film bearing of the aforementioned type whereby economically assuring the hydrostatic function of the bearing and in which the inspection of the throttles (15, 15') is possible without further ado. To this end, the invention provides that the at least two boreholes (6, 6') are connected to a connection block (12), the throttles (15, 15') are accommodated inside this connection block (12), and the check valve (18) is assigned to said connection block (12).

6 Claims, 3 Drawing Sheets

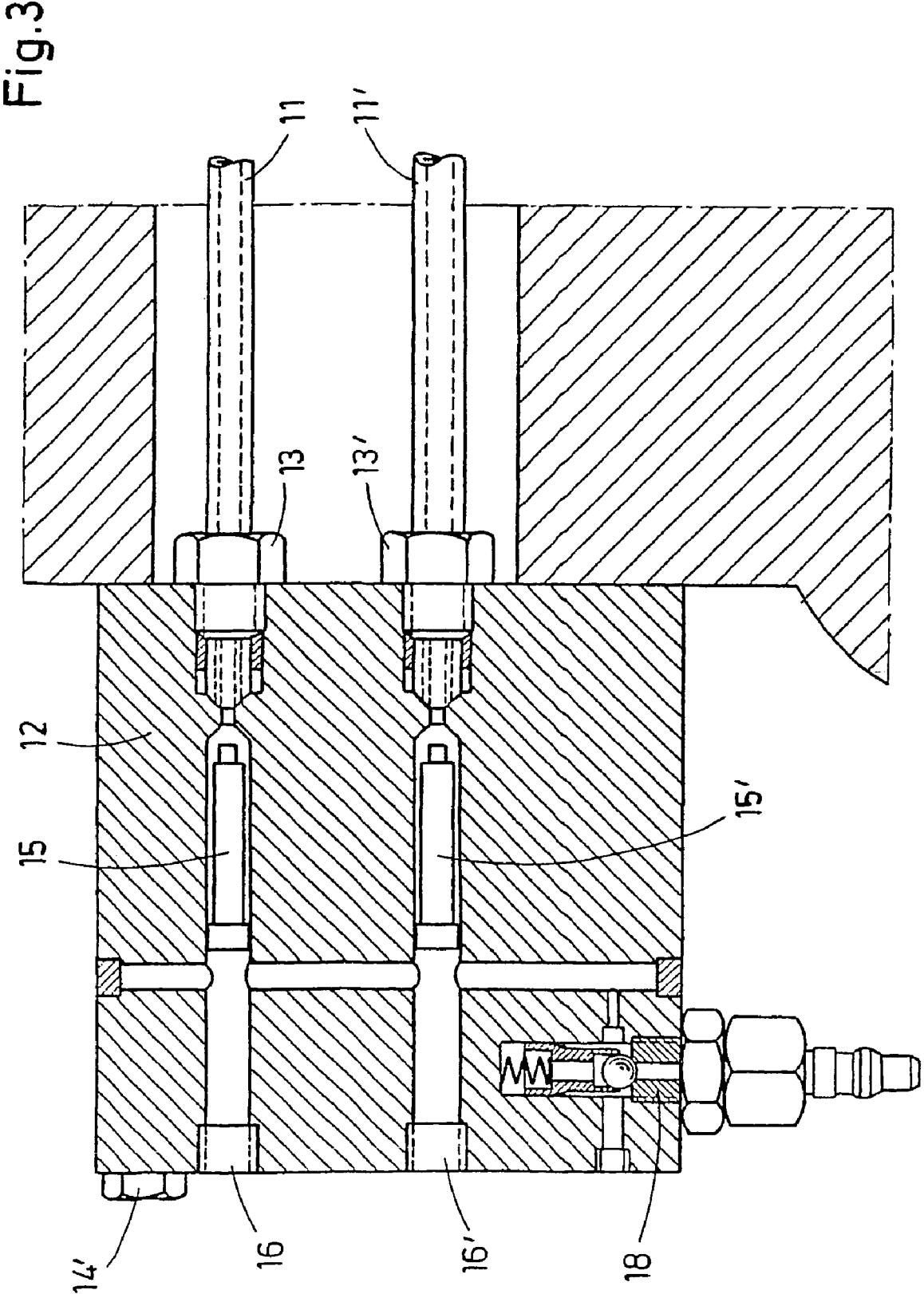

OIL FILM BEARING FOR ROLL PINS HAVING A HYDROSTATIC SUPPORT

The invention concerns an oil film bearing for roll necks, which is surrounded or whose neck bush mounted thereon is surrounded by a bearing bush mounted in a chock, wherein the bearing bush has at least two internal hydrostatic pockets, which are arranged essentially on a common axial line and can be supplied with a pressure medium via a check valve and via bores that run inside the bearing bush, and wherein throttles in the bores ensure an optimum hydrostatic bearing, even when the roll neck or the neck bush is in a skewed position in the bearing bush.

Oil film bearings of this type are well known. They generally have two pressure zones that are displaced by 180° in a bearing bush. In each of these pressure zones, two hydrostatic pockets are axially displaced. In this regard, the hydrostatic pockets of one pressure zone are used in the operation until optimum hydrostatic properties are no longer ensured due to wear in the area of the pressure zone. The bearing bush can then be turned 180° in the chock, so that the other two hydrostatic pockets of the second pressure zone can be used. Throttles are inserted in the four bores to the two hydrostatic pockets of each pressure zone. Due to the thin wall thickness of the bearing bushes and the resulting very small diameters of the bores, the throttles are very delicately constructed. Their purpose is to distribute the pressure medium coming from a pressure connection, at which pressure medium is present at a pressure of about 200 to 2,000 bars, as uniformly as possible to the two hydrostatic pockets of a pressure zone.

If one of the hydrostatic pockets of the pressure zone is uncovered halfway due to a skewed position of the neck bush in the bearing bush, relatively more pressure medium can flow out of the uncovered hydrostatic pocket. This would cause a large pressure drop in this hydrostatic pocket. The effect of the throttles is to limit the pressure drop in this bearing pocket. The resulting pressure difference between the two hydrostatic pockets results in the development of a correction moment, which counteracts the skewed position.

In oil film bearings of this type, four of the very delicate and very expensive throttles are housed in a bearing bush. However, only two of the four throttles are used. Since the throttles are housed in the bores of the bearing bushes, it is possible to inspect and, if necessary, change the throttles only if the complete bearing is dismounted to allow the service personnel to get to the bores in the bearing bush. Since the throttles are very delicately constructed, they can easily become clogged, especially if the oil being supplied is not sufficiently filtered. The hydrostatic function fails if the throttles become clogged. For the aforementioned reasons, preventive inspection is possible only with a great deal of labor.

The two bores to the hydrostatic pockets are brought together in the bearing bush, so that they can be supplied by a check valve. For this purpose, in the previously known bearing bush, a shoulder is formed by very cost-intensive buildup welding in its peripheral region that is used for the connection. The two bores are joined in this shoulder by essentially radially running, intersecting bores. The check valve is axially connected at the point of intersection of the intersecting bores.

Due to the limited installation space for the bearing bush, the connection of the check valve to the bearing bush is also often the cause of operational disruptions. Leaks can easily occur due to loosening of the high-pressure bolted connections of the check valves. Loosening of the check valves, whose purpose is to keep the pressure medium in the hydrostatic pockets, even if, e.g., the high-pressure hoses to the check valve are no longer supplying pressure medium due to a malfunction, can occur, e.g., due to faulty mounting of the check valves in the limited installation space. Since four bearings are supplied by one pressure system, the leak at one check valve can lead to failure of the hydrostatic system in all four bearings.

The objective of the invention is to refine an oil film bearing in accordance with the invention in such a way that the hydrostatic function of the bearing is ensured in an inexpensive way and that inspection of the throttles is possible at any time.

To this end, it is proposed that the two or more bores of a pressure zone be connected with a connection block, that the throttles be accommodated inside the connection block, and that the check valve be assigned to the connection block.

As a result of the removal of the throttles from the bearing bush and their placement in a connection block, the throttles are now used in an area that is no longer dependent on the limited diameter of the bores of the bearing bushes. In accordance with the invention, it is possible to use not only throttles of the previously known type but also larger throttles, which can be manufactured less expensively and are less subject to clogging. The check valve is also no longer mounted in the limited installation space of the bearing bush but rather on the connection block, so that the connections of the check valve are more accessible, and no mounting errors occur, since there is sufficient space, and thus no leaks occur.

It is advantageous if the connection block is mounted on the chock in such a way that it is freely accessible, so that dismounting of the bearing is no longer necessary to inspect the throttles.

It has been found to be advantageous for the two or more bores of a pressure zone that lead to the two or more hydrostatic pockets to be connected with the connection block by high-pressure connections and by rigid lines. In this regard, continual mounting and dismounting of the check valve is unnecessary, since the throttles can be inspected outside of this system.

Due to the connection of two high-pressure lines, the cross connection of the bores in the bearing bush is eliminated. Consequently, the cost-intensive buildup welding of a shoulder can also be eliminated.

It has been found to be effective for the lines to consist of tubes which can withstand a large pressure but which nevertheless are elastically deformable to compensate any bearing play that may be present. For this purpose, the tubes can be configured, e.g., in the form of a loop, so that despite their rigid construction, they are capable of compensating possible relative movement between the chock, which supports the connection block, and the bearing bush.

The invention is explained in greater detail below on the basis of an example.

FIG. 3 shows the connection block with the check valve.

Figure 1:
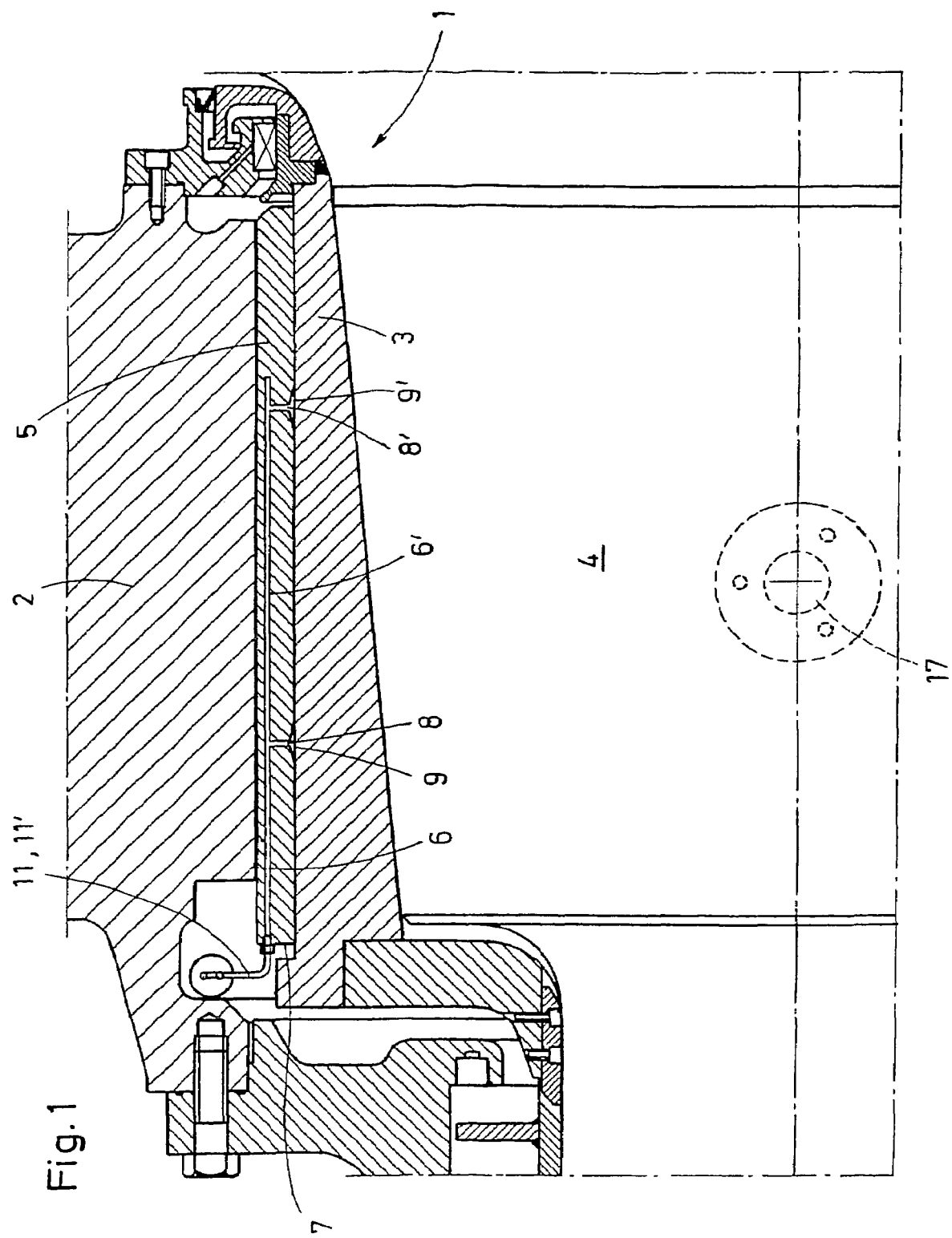
FIG. 1 shows the oil film bearing of the invention.

FIG. 1 shows an oil film bearing 1, which is mounted in a chock 2 and consists of a neck bush 3, which is mounted on a roll neck 4, and of a bearing bush 5, which is seated in the chock 2.

Two, bores 6, 6', which lie partially one behind the other, are arranged in the bearing bush 5 and extend from the outer edge 7 of the bearing bush 5 to radial bores 8, 8', which terminate in hydrostatic pockets 9, 9'.

Figure 2:
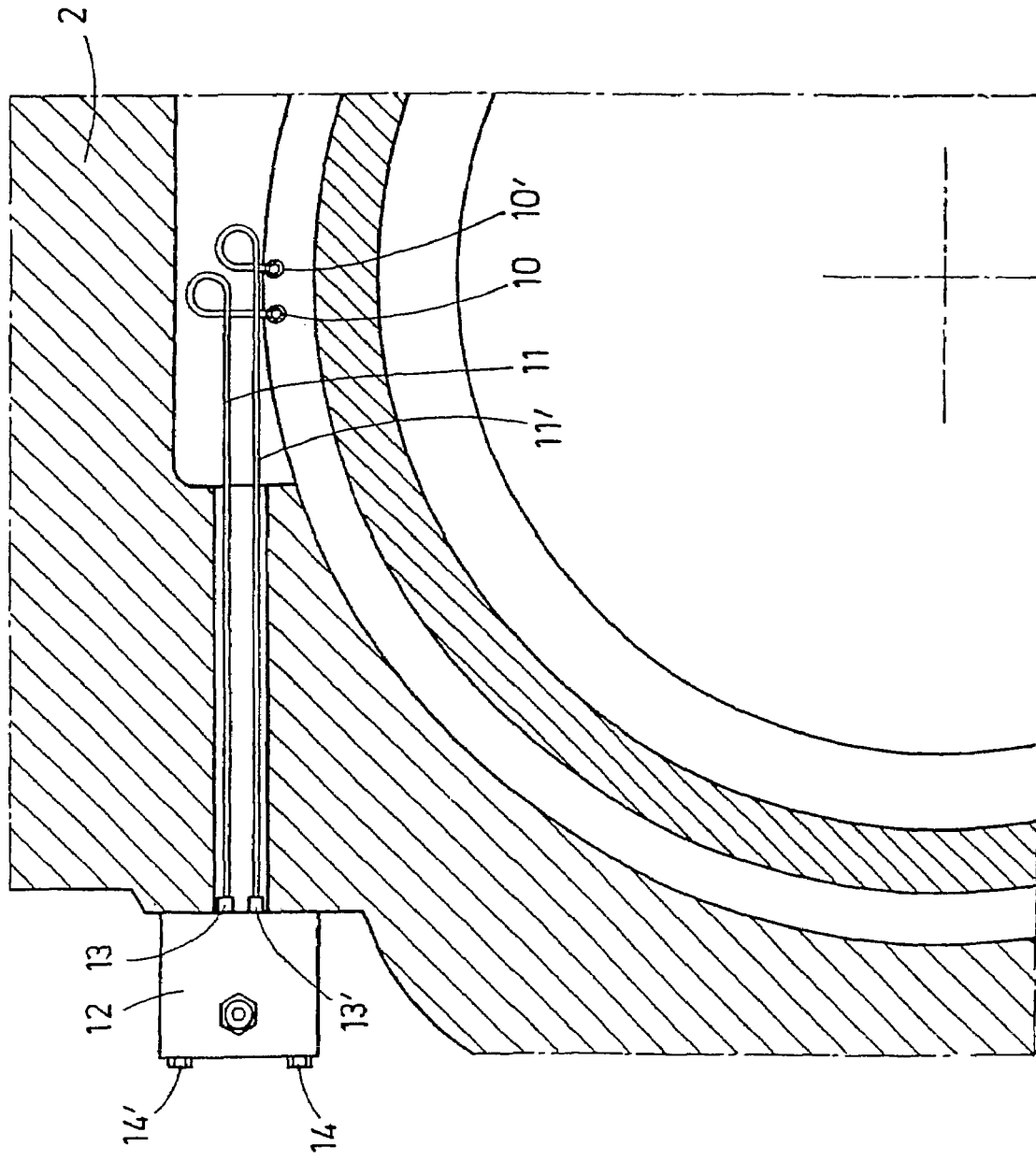
FIG. 2 shows the connection of the oil film bearing with the connection block.

High-pressure connections 10, 10' are provided on the bearing bush 5. Rigid lines 11, 11' are attached to the high-pressure connections 10, 10' and run to a connection block 12, where they are likewise attached by high-pressure connections 13, 13' (see FIG. 2). The connection block 12 is mounted on the chock 2 by bolts 14, 14'.

FIG. 3 shows the lines 11, 11', which are connected with the connection block 12 by the high-pressure connections 13, 13'. The throttles 15, 15' are located in the connection block 12. After the removal of immediately accessible plugs 16, 16', the throttles can be easily removed from the connection block 12 to inspect or replace them. Sufficient room can be provided in the connection block 12 to allow the use of throttles that are not as delicately constructed as the throttles s that have previously been used in the bores of the bearing bushes. In addition, only two throttles are provided. If the bearing bush 5 is turned 180°, only the high-pressure connections 10, 10' must be detached. After a retaining bolt 17 (see FIG. 1) has been removed, the bearing bush 5 can be turned 180°, and the bores, which have likewise been turned 180°, can be connected with the high-pressure connections 10, 101. This results in a savings of two throttles. Now only two throttles are needed instead of the usual four.

FIG. 3 also shows the check valve 18, which is likewise mounted on the block 12 in a way that makes it readily accessible. Due to this easy accessibility, mounting errors during the mounting of the check valve 18 are also eliminated.

LIST OF REFERENCE NUMBERS 1 oil film bearing
2 chock
3 neck bush
4 roll neck
5 bearing bus
6 bore
7 edge
8 radial bore
9 hydrostatic pocket
10 high-pressure connection
11 line
12 connection block
13 high-pressure connection
14 bolt
15 throttle
16 plug
17 retaining bolt
18 check valve

The invention claimed is:

1. Oil film bearing (1) for roll necks (4), which is surrounded or whose neck bush (3) mounted thereon is surrounded by a bearing bush (5) mounted in a chock (2), wherein the bearing bush (5) has at least two internal hydrostatic pockets (9, 9'), which are arranged essentially on a common axial line and can be supplied with a pressure medium via a check valve (18) and via two or more bores (6, 6') that run inside the bearing bush (5), and wherein throttles (15, 15') ensure an optimum hydrostatic bearing, even when the roll neck (4) or the neck bush (3) is in a skewed position in the bearing bush (5), wherein the two or more bores (6, 6') are connected with a connection block (12), the throttles (15, 15') are accommodated inside the connection block (12), and the check valve (18) is assigned to the connection block (12).

2. Oil film bearing in accordance with Claim 1, wherein the connection block (12) is mounted on the chock (2) in such a way that it is freely accessible.

3. Oil film bearing in accordance with claim 1, wherein the bores (6, 6') and the connection block (12) are provided with high-pressure connections (10, 10'; 13, 13') and that the high-pressure connections (10, 10') of the bores (6, 6') are connected with the high-pressure connections (13, 13') of the connection block (12) by rigid lines (11, 11')

4. Oil film bearing in accordance with Claim 3, wherein the lines (11, 11') consist of tubes that withstand pressures above 2,000bars and are elastically deformable to compensate possible relative movement between the bearing bush (5) and the chock (2).

5. Oil film bearing in accordance with claim 1, wherein the check valve (18) and/or the throttles (15, 15') are replaceably assigned to the connection block (12).

6. Oil film bearing in accordance with claim 1, wherein the bearing bush is a bearing bush (5) without a shoulder.

* * * * *